Figure 1:
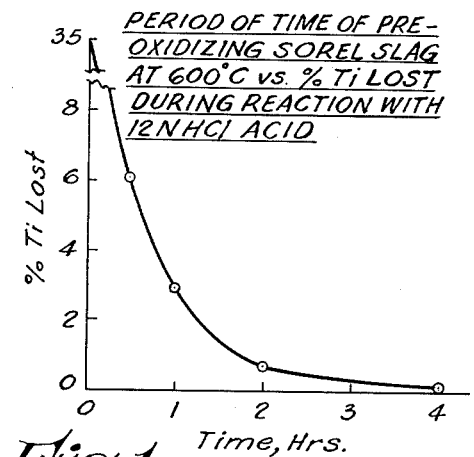

Oct. 23, 1962   J. J. LEDDY ET AL   3,060,002
PRESSURE LEACHING OF TITANIFEROUS MATERIAL
Filed Sept. 25, 1959

INVENTORS.
James J. Leddy
Dale L. Schechter
BY
C.W. Carlin
ATTORNEY

3,060,002
PRESSURE LEACHING OF TITANIFEROUS MATERIAL

James J. Leddy and Dale L. Schechter, Midland, Mich., assignors to The Dow Chemical Company, Midland, Mich., a corporation of Delaware
Filed Sept. 25, 1959, Ser. No. 842,428
2 Claims. (Cl. 23—202)

The invention relates to the treatment of titanium-containing source material contaminated with iron, calcium, or magnesium to produce a beneficiated titanium source material substantially free of iron, magnesium, and calcium.

A number of raw materials which contain titanium in sufficient percent to serve as commercial sources of titanium also contain iron and often varying lesser amounts of magnesium and calcium. The presence of the iron, calcium, and magnesium has presented a problem of separation. Illustrative of such materials are (1) ilmenite, an ore comprising a complex compound of oxides of iron and titanium together with such impurities as silicious materials including those of calcium and magnesium, and (2) Sorel slag, a by-product obtained during iron production from a titanium-containing iron ore in Sorel, Canada.

Attempts to remove the iron, and often calcium, and magnesium as well, from such titanium-bearing materials in the production of titanium therefrom have included high temperature treatments such as roasting and fusing, and dissolution of the entire body of the ore being treated and subsequent separation steps based on relative solubilities, or by leaching with a hot lixiviant, e.g., sulfuric acid, at atmospheric pressure. In such practices, there is usually unsatisfactory separation of titanium from the iron and other contaminants and there is, accordingly, a final separation step required. Such known practices require objectionably long periods of treatment. Furthermore, unless the ore is completely dissolved in such solvents as sulfuric acid, the titanium values recovered by precipitation (an undesirably protracted operation) objectionably large percents of the titanium are lost.

Illustrative of presently widely used methods of preparing $TiO_2$ from ilmenite is one which involves the following steps:

(1) Digestion of the ilmenite in an excess of sulfuric acid to convert the iron and titanium compounds to soluble ones. (2) Clarification of the solution thus produced which requires treatment in the presence of a coagulating agent such as a soluble sulfide and/or a proteinaceous material, e.g., glue, to form a floc which carries down colloidal silica and the like, and thereafter decanting off the titanium-containing solution, crystallizing some of the iron compounds in the solution, and separating the crystals thus formed by filtration. (3) Hydrolysis of the filtrate to convert the titanium compounds, present largely as titanyl sulfate, to insoluble hydrous titanium oxide, a highly critical step requiring especially careful control to insure a satisfactory yield. (4) Filtering and washing the hydrous $TiO_2$, usually including repulping with dilute sulfuric acid to remove more residual iron. (5) Treatment of the precipitate thus produced, largely to remove absorbed sulfuric acid, with such conditioning agent as an alkali or alkaline earth oxide or carbonate, and thereafter calcining the resulting mixture to drive off water. (6) Finishing steps including pulverizing the $TiO_2$ and slurrying the pulverized ore with water, usually in the presence of an alkali silicate or phosphate as a dispersant, and thereafter thickening the slurry as by adding a coagulant such as $MgSO_4$ or NaCl, and further grinding the thickened slurry followed by filtering, washing, and drying.

Some of the titanium dioxide produced by such methods is later converted into other compounds, e.g., $TiCl_4$, for use in the Kroll or similar process for the production of titanium metal sponge.

It is clear from a study of known methods, of which the above is illustrative, that the obtainment of titanium dioxide from ilmenite by known methods is tedious and costly.

A method offering some advantages over theretofore known method of producing substantially iron-free $TiO_2$ from titaniferous iron materials is described in U.S. Patent 2,731,327. In that patent a mixture consisting of the titaniferous material, sulfuric acid, and an organic flotation agent, e.g., nonanoic acid, and a reducing agent, e.g., carbon, preferably with $SO_2$, is heated at between 250° and 335° C. at a pressure of between 500 and 2000 p.s.i. in an autoclave.

None of the now known methods is fully satisfactory, however. Although the use of sulfuric acid under pressure has some advantages over theretofore known methods, it is encumbered by certain disadvantages among which are: a flotation agent, e.g., nonanoic acid is required; the sulfuric acid employed dissolves an undesirable percent of the titanium which is thereby lost; a reducing agent, e.g., carbon, is required; $SO_2$ gas, which is ordinarily an objectionable gas to employ, is necessary for satisfactory results; externally provided pressure preferably approaching 2000 p.s.i.g., is required; there is no evidence that calcium and magnesium are removed by such processes.

A desideratum, therefore, exists for an improved method of obtaining $TiO_2$ which is low in iron, calcium, and magnesium from ilmenite and titanium-bearing by-product slag.

The present invention provides such a method which requires a relatively short period of time for effective removal of substantially all the iron and such salt-forming elements as calcium and magnesium which often form objectionable salts when the $TiO_2$ is subsequently used, e.g., when a bed thereof is treated at an elevated temperature in the presence of particulated carbon by passing chlorine or hydrogen chloride gas upwardly through the bed to produce $TiCl_4$.

In the preparation of $TiO_2$ for subsequent chlorination to $TiCl_4$, e.g., to use for producing titanium sponge, it is unnecessary to remove all the iron. For such purpose, it is considered acceptable if the iron content is no more than about 10 percent of titanium content. The invention is especially suitable for beneficating a titanium ore to reduce the iron content to such a satisfactory low percent and at the same time remove the Ca and Mg to a percent no longer objectionable.

The invention consists essentially of a method of converting a particulate titanium-bearing material contaminated with at least one of iron, magnesium, and calcium, to a titanium-source material which is substantially free of such contaminants consisting essentially of admixing in a substantially pressure-tight vessel (so that the reaction will proceed at the autogenous pressure thereof) said contaminated titanium-bearing material, preferably containing at least about 25 percent titanium, with hydrochloric acid and digesting the resulting mixture at an advanced temperature at the autogenous pressure of the reaction.

The practice of the invention may be carried out in a suitable metal, or graphite, plastic, ceramic, brick, Alundum, or Pyrex glass reaction vesesl. The material of which the vessel is constructed must be resistant to chemical attack by the acid. Metal vessels which are lined with tantalum or zirconium may be used. When a glass vessel is employed, it is advisable that it be placed in a pressure bomb and, as an added precaution against breakage of the glass vessel, the space between the inner walls of the bomb and the outer wall of the reaction vessel be packed with a material of the nature of glass wool into which some water is usually placed. The water, when heated, is converted to steam, the pressure exerted thereby against the outer wall of the reaction vessel serving as a prevention against breakage of the glass vessel.

In carrrying out the invention, the iron-contaminated titanium-containing material is pulverized to particle sizes passing through at least about a No. 200 sieve and preferably a No. 325 sieve. A suitable vessel is then charged with the reaction mixture. The relationship of the amount of the charge to the volume of the reaction vessel is not sharply critical except that the charge should be sufficiently large to insure the existence of both a liquid phase and a gas phase in the vessel during a substantial portion of the ensuing reaction. So long as some liquid exists during the reaction, there is assurance that the reaction is taking place at the autogenous pressure of the reaction. The charge consists of particulate titaniferous material, e.g., Sorel slag or ilmenite, upon which an analysis has usually been run, and hydrochloric acid, preferably between 6 and 12 N, in an amount sufficient to provide preferably between about 1.2 and 2.4 parts by weight of the acid, calculated as 12 N, to 1 part by weight of the ore. More or less acid may be used. The amount of acid is dependent upon the iron content of the ore and upon the extent to which it is desired that the beneficiated product be free of iron. Sorel slag, which is lower in iron than ilmenite, requires less acid. It is recommended that not less than 1.8 parts of the acid, calculated as 12 N, be employed for 1 part of ilmenite to produce a titanium material containing less than about 2 percent iron. The upper limit of the acid is not sharply critical, but more than about 2.5 parts of 12 N acid to 1 part ore is not usually used. The vessel is then sealed shut. If desired, the vessel may be partially evacuated prior to sealing to a pressure, e.g., of between 0.1 and 1.0 millimeter of mercury and sealed shut while thus evacuated. The vessel containing the ore and acid is then heated so that the contents thereof are heated to a temperature between about 150° and 250° C., but usually about 200° C., for at least 0.25 hour but usually for a period of between 1 and 6 hours, although a period of 8 hours or longer may be employed. The reaction is thus carried on at the autogenous pressure of the reaction mass. The reaction vessel and contents are then cooled. The contents are removed therefrom and filtered to recover a precipitate which contains the titanium values. The precipitate is then preferably washed with diluted hydrochloric acid and subsequent thereto with water and thereafter dried at about 110° C.

Analysis of the beneficiated titanium source material thus produced according to the invention shows that from 80 to 99 percent of the iron present is removed. For example, an ore or slag containing 12 percent iron will be reduced to one containing from about 0.1 percent to 1.5 percent iron. The percent of iron removed is dependent upon a number of factors among which are the ratio of acid to ore, temperature, and period of time employed. A weight ratio of from 2 to 2.5 hydrochloric acid, calculated as 12 N, to 1 of the titanium-containing material usually removes between 95 and 99 percent of the iron when heated to about 200° C. for at least 4 hours.

If the iron is present in any appreciable percent as lower valence iron, it is advisable to oxidize the iron-contaminated titanium material to convert all $Fe^{++}$ to $Fe^{+++}$ as a step in treatment of the material in accordance with the invention. It is particularly advisable to preoxidize when the titanium material being treated is a by-product slag from iron production. Oxidation, when employed, is carried out by heating the titanium-bearing material at from about 500° to 1000° C. but usually at about 600° C. while passing air or oxygen gas therethrough.

Preoxidizing the titanium-bearing material definitely reduces the titanium loss during the hydrochloric acid treatment under pressure in accordance with the invention. The percent of titanium lost when the Fe is removed according to the invention, following preoxidation, is usually less than 0.01 percent and often is too small to be determined quantitatively.

The following examples were run to illustrate the practice of the invention. The procedure consisted of analyzing either the ilmenite or the Sorel slag for metals considered to be of interest. The results of the analyses made are set out in Table I below.

TABLE I

*Percent by Weight of Metals Present in the Raw Material for Which an Analysis Was Made*

|    | Sorel Slag | Ilmenite |
|----|------------|----------|
| Ti | 42.90      | 35.50    |
| Fe | 11.00      | 14.10    |
| Si | 2.00       | 0.09     |
| Al | 1.27       | 0.21     |
| Ca | 0.53       | 0.01     |
| Mg | 3.04       | 0.01     |
| Cr | 0.14       | Nil      |
| V  | 0.16       | 0.02     |
| Mn | 0.20       | 0.10     |

When slag was employed, a ten gram sample thereof was first oxidized by passing heated oxygen or air therethrough prior to placing in the reaction vessel. When ilmenite was employed, a 10 gram sample thereof was directly charged without oxidation into the reaction vessel. The reaction vessel employed was a 1 x 5 inch Pyrex glass ampoule. The ampoule was then exhausted to about 1 mm. of mercury, sealed, wrapped in glass wool (to serve as a cushioning material) and placed in a steel bomb. About one-half pint of water was poured into the glass wool in the steel bomb, which was then closed, rotated slowly in a horizontal plane, and heat applied to the bomb by means of a gas burner to heat the ore or slag at the temperatures and for the periods of time set out in Tables II and III. Thereafter the bomb was cooled and the ampoule taken out and opened. The reaction product was removed, washed, and analyzed for titanium, iron, calcium, and magnesium.

The first series of examples were run employing 10 grams of either unoxidized or preoxidized Sorel slag as later indicated. The slag had the analysis shown in Table I. The amount and concentration of the acid, the temperature, the reaction time, and the percent titanium and iron in the beneficiated slag so prepared are set out in Table II.

An examination of Table II shows that best results are obtained when the Sorel slag is preoxidized for at least 4 hours at about 300° C. or above.

The table also shows that a reaction mixture containing at least 10 milliliters of 12 N hydrochloric acid or its equivalent, e.g. 20 milliliters of 6 N, for 10 grams of the slag, produced excellent results when heated as set out in Table II for at least an hour in a sealed reaction vessel. Since the specific gravity of 12 N hydrochloric acid is about 1.184, this mixture provides a weight ratio of 1.184 grams of 12 N acid to 1.0 gram of the slag. The results obtained with 5 milliliters of 12 N acid and 10 grams of the slag, e.g., 48.4 percent Ti and 4.4 percent Fe, were satisfactory, however, to provide a beneficiated titanium source, suitable for a number of uses.

The analysis of the product produced showed it to contain as high as 53 to 54 percent titanium and as little as 0.12 percent iron. Analysis of the products produced for the calcium and magnesium content thereof showed none that contained as much as 0.2 percent of either Ca or Mg.

TABLE II

| Example No. | Hydrochloric Acid Ml. Used | Hydrochloric Acid Normality | Slag Condition | Temp. of Reaction in °C. | Period of Reaction in Hours | Product Analysis Percent Ti | Product Analysis Percent Fe |
|---|---|---|---|---|---|---|---|
| 1 | 40 | 6 | Unoxidized | 200 | 2.0 | 53.0 | 1.6 |
| 2 | 40 | 6 | ----do------ | 200 | 0.25 | 53.0 | 1.6 |
| 3 | 40 | 6 | ----do------ | 125 | 0.25 | 45.0 | 11.0 |
| 4 | 40 | 6 | ----do------ | 150 | 0.25 | 47.0 | 8.0 |
| 5 | 40 | 6 | ----do------ | 175 | 0.25 | 49.0 | 6.0 |
| 6 | 40 | 6 | ----do------ | 200 | 0.08 | 46.0 | 5.0 |
| 7 | 40 | 6 | Oxidized a | 200 | 0.25 | 50.0 | 2.5 |
| 8 | 40 | 6 | ----do a------ | 150 | 5.0 | 47.2 | 7.5 |
| 9 | 20 | 6 | ----do a------ | 200 | 0.5 | 48.0 | 5.2 |
| 10 | 20 | 12 | ----do a------ | 200 | 1.0 | 50.8 | 3.0 |
| 11 | 20 | 6 | ----do a------ | 200 | 1.0 | 48.3 | 5.2 |
| 12 | 10 | 6 | ----do a------ | 200 | 1.0 | 46.9 | 6.8 |
| 13 | 15 | 6 | ----do a------ | 200 | 1.0 | 47.2 | 5.8 |
| 14 | 5 | 6 | ----do a------ | 200 | 1.0 | 44.2 | 8.7 |
| 15 | 10 | 12 | ----do a------ | 200 | 1.0 | 50.0 | 3.5 |
| 16 | 5 | 12 | ----do a------ | 200 | 1.0 | 46.0 | 6.1 |
| 17 | 15 | 12 | ----do a------ | 200 | 1.0 | 50.0 | 3.1 |
| 18 | 15 | 12 | ----do a------ | 200 | 0.5 | 47.8 | 4.9 |
| 19 | 15 | 12 | ----do a------ | 200 | 2.0 | 49.6 | 2.7 |
| 20 | 7.5 | 12 | ----do a------ | 200 | 2.0 | 48.2 | 3.4 |
| 21 | 10 | 12 | ----do a------ | 200 | 6.0 | 53.3 | 0.5 |
| 22 | 20 | 12 | ----do a------ | 200 | 2.0 | 52.0 | 1.5 |
| 23 | 10 | 12 | ----do a------ | 200 | 3.0 | 50.0 | 0.83 |
| 24 | 10 | 12 | ----do a------ | 200 | 4.0 | 52.6 | 0.53 |
| 25 | 5 | 12 | ----do a------ | 200 | 6.0 | 48.4 | 4.4 |
| 26 | 15 | 12 | ----do a------ | 200 | 2.0 | 51.4 | 1.68 |
| 27 | 20 | 12 | ----do a------ | 200 | 2.0 | 51.9 | 1.44 |
| 28 | 20 | 12 | ----do a------ | 200 | 6.0 | 54.2 | 0.30 |
| 29 | 5 | 12 | ----do a------ | 200 | 2.0 | 47.5 | 4.99 |
| 30 | 10 | 12 | ----do a------ | 200 | 8.0 | 57.2 | 0.62 |
| 31 | 10 | 12 | ----do b------ | 200 | 8.0 | 52.5 | 1.1 |
| 32 | 10 | 12 | ----do a------ | 200 | 6.0 | 54.3 | 0.5 |
| 33 | 10 | 12 | ----do c------ | 200 | 6.0 | 51.8 | 0.6 |
| 34 | 10 | 12 | ----do d------ | 200 | 6.0 | 53.0 | 0.2 |
| 35 | 10 | 12 | ----do e------ | 200 | 6.0 | 53.5 | 0.13 |
| 36 | 10 | 12 | ----do f------ | 200 | 6.0 | 54.0 | 0.12 | a Oxygen gas passed through the slag for 4 hours at 600° C.
b Oxygen gas passed through the slag for 4 hours at 300° C.
c Oxygen gas passed through the slag for 4 hours at 900° C.
d Air passed through the slag for 4 hours at 300° C.
e Air passed through the slag for 4 hours at 600° C.
f Air passed through the slag for 4 hours at 900° C.

A second series of examples was run at 200° C. following generally the same procedure and employing the same apparatus as those of Table II, except that 10 grams of ilmenite, having the analysis shown in Table I, were employed instead of the Sorel slag. The ilmenite was not preoxidized because the iron is present largely in the ferric form. The pertinent operating conditions and percent Fe and Ti in the product are set out in Table III.

TABLE III

| Example No. | Hydrochloric Acid Ml. Used | Hydrochloric Acid Normality | Period of Reaction in Hours | Product Analysis [1] Percent Ti | Product Analysis [1] Percent Fe |
|---|---|---|---|---|---|
| 37 | 40 | 6 | 0.25 | 57.0 | 0.4 |
| 38 | 40 | 6 | 0.5 | 58.0 | 0.45 |
| 39 | 20 | 12 | 0.5 | 58.0 | 0.4 |
| 40 | 20 | 12 | 1.0 | 56.2 | 1.85 |
| 41 | 15 | 12 | 1.0 | 53.1 | 3.3 |
| 42 | 10 | 12 | 1.0 | 48.5 | 10.4 |
| 43 | 5 | 12 | 1.0 | 46.0 | 12.1 |
| 44 | 20 | 6 | 1.0 | 44.2 | 15.7 |
| 45 | 10 | 6 | 1.0 | 42.2 | 21.4 |
| 46 | 5 | 6 | 1.0 | 38.6 | 21.8 |
| 47 | 20 | 12 | 2.0 | 57.0 | 0.82 |
| 48 | 15 | 12 | 2.0 | 54.8 | 3.2 |
| 49 | 10 | 12 | 2.0 | 50.8 | 8.7 |
| 50 | 7.5 | 12 | 2.0 | 45.9 | 13.3 |
| 51 | 10 | 12 | 4.0 | 44.2 | 13.1 |
| 52 | 5 | 12 | 4.0 | 39.4 | 16.7 |
| 53 | 20 | 12 | 6.0 | 56.8 | 0.49 |
| 54 | [2] 15 | 12 | 6.0 | 51.3 | 7.6 |
| 55 | 10 | 12 | 6.0 | 50.2 | 7.4 |
| 56 | 5 | 12 | 6.0 | 43.0 | 16.6 |
| 57 | 10 | 12 | 8.0 | 51.4 | 7.3 |
| 58 | 5 | 12 | 8.0 | 43.5 | 15.3 |

[1] Further analysis of the product showed it to contain nor more than 0.2 percent of either Ca or Mg.
[2] 1 ml. of concentrated nitric acid was added to the concentrated hydrochloric acid in this example.

The results of Table III show that employing 20 milliliters of 12 N hydrochloric acid, or an equivalent amount of 6 N, with 10 grams of the ore, at 200° C. for at least 15 minutes according to the invention produced excellent results. They also show that employing the same amount of the acid at the same temperature for 2 hours did not produce better results. They do show, however, that when less acid was used, a longer reaction time is advisable. For example, reacting the ore with 10 ml. of 12 N acid for a period of 1 hour resulted in a product containing 48.5 percent Ti and 10.4 percent Fe whereas employing the same strength acid for 2 hours produced a product containing 50.5 percent Ti and 8.7 percent Fe. To obtain best results, therefore, it is recommended that at least 1.5 ml. and preferably 2.0 ml. of 12 N hydrochloric acid (or the equivalent amount of less concentrated hydrochloric) be employed per gram of the ilmenite, or a minimum weight ratio of about 1.8 parts of 12 N hydrochloric acid to 1 part of ilmenite and preferably about 2.4 parts of the 12 N acid to 1 part of the ilmenite.

A third series of examples was run to show the effect of preoxidizing Sorel slag, ground to pass through a No. 325 sieve, for varying lengths of time. Four samples of the slag were placed in a simple tube furnace and oxygen gas passed therethrough at 600° C. for 1, 2, 3, and 4 hours, respectively. Thereafter, a 10 gram sample from each of the oxidized samples and a fifth 10 gram sample of unoxidized slag were weighed. Each of the slag samples together with 20 milliliters of 12 N hydrochloric acid were then charged into the reaction vessel according to the procedure employed in the previous examples. Each sample was heated in the sealed vessel for 6 hours at 200° C., the reaction product was removed, filtered, and washed and the precipitate analyzed for Ti and Fe as aforesaid.

The percent Ti lost was plotted against the period of time of preoxidation, thereby obtaining the graph shown in FIGURE 1 of the drawing. The graph clearly shows a marked reduction in percent Ti lost as the preoxidation time was increased to 2 hours and a continued but less marked reduction in percent Ti lost as the preoxidation was continued to 4 hours.

A fourth series of examples was run in which the examples described above under series three was repeated except that the preoxidation was carried on for 4 hours in all the examples but the temperature employed during oxidation was varied. The preoxidized slag thus reacted with hydrochloric acid was removed and analyzed.

Figure 2:
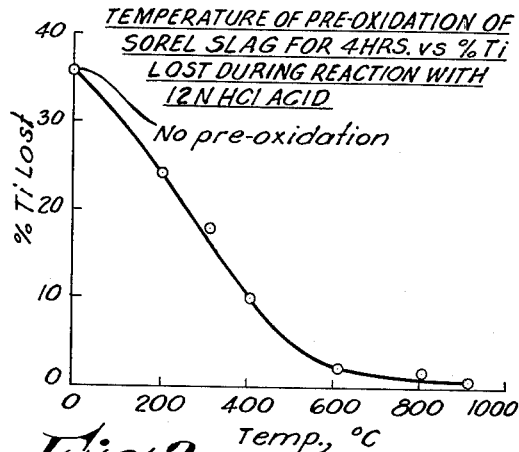

The percent Ti lost was plotted against the temperature employed during preoxidation thereby obtaining the graph shown as FIGURE 2 of the drawing. The graph shows that preoxidation at a temperature between 600° and 900° C. lessens the percent Ti lost in the subsequent reaction with the acid.

A fifth series of examples was run in which Sorel slag was preoxidized for 4 hours at 900° C. Four 10 gram samples thereof were weighed out and each reacted with 20 milliliters of 12 N hydrochloric acid as in the examples above except that the temperature employed during the acid reaction period was varied from 125° C. to 200° C. The product made in each example was recovered and analyzed as above.

Figure 3:
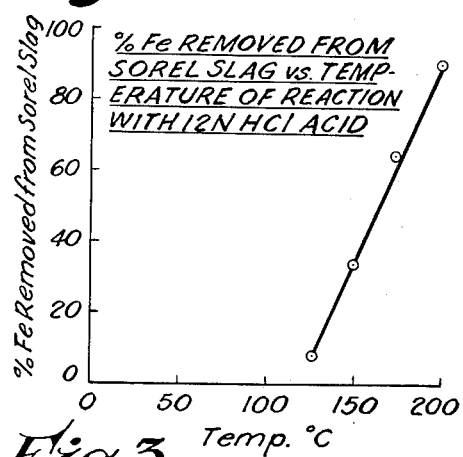

The percent of the iron originally present which was removed from the product was plotted against the temperature of reaction, thereby obtaining the graph shown in FIGURE 3 of the drawing. The graph shows that the iron removal is markedly better at 200° C. than at lower temperatures and that less than about 150° C. appears unsatisfactory at least for some purposes since the ratio of iron to Ti is greater than 1 to 10 which is an excess of Fe for use in subsequent chlorination of the beneficiated Ti-bearing material.

A sixth series of examples was run to show the effect of reaction time and amount of acid used on iron removal. Sorel slag was preoxidized for 4 hours at 900° C. Nine 10 gram samples were weighed. Five were charged into the reaction vessel employed in the previous examples together with 10 milliliters of 12 N hydrochloric acid and four were charged into the reaction vessel together with 20 milliliters of 12 N hydrochloric acid. The procedure was otherwise that followed in the above series of examples.

Figure 4:
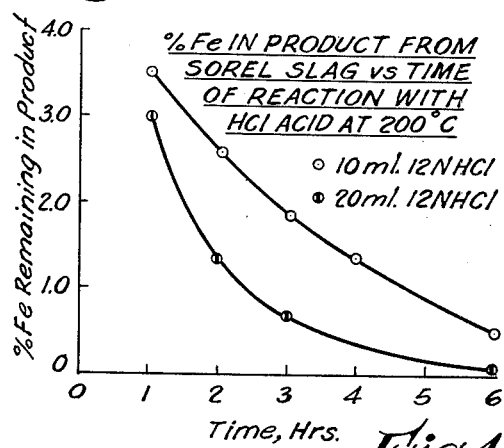

The percent Fe remaining in the product obtained was plotted against the time of reaction in hours, thereby obtaining the graph shown in FIGURE 4 of the drawing. The figure shows that the longer reaction time lessens the Fe remaining in the product produced. It further shows that 20 milliliters of acid with 10 grams of slag (about 2.4 parts of 12 N acid to 1 of slag by weight) yielded a product of lower Fe content than a lesser amount of the acid.

A seventh series consisting of six examples was run following the procedure of series six except that ilmenite was employed instead of Sorel slag. The ilmenite was not preoxidized because results are not noticeably improved thereby.

Figure 5:
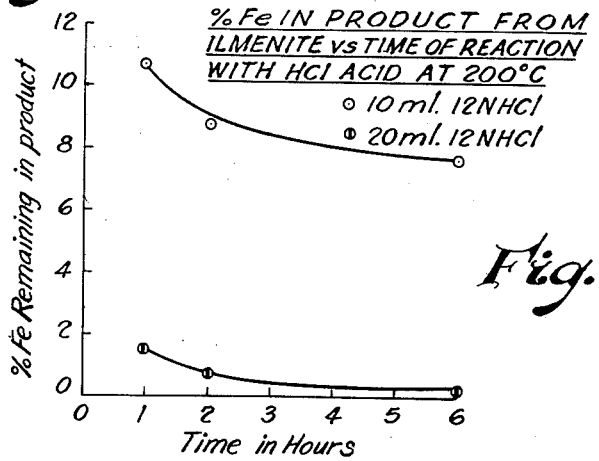

The percent of Fe remaining in the product obtained was plotted against the time of reaction in hours thereby obtaining the graph shown in FIGURE 5 of the drawing. Reference to FIGURE 5 shows that 20 milliliters of 12 N acid is greatly to be preferred over 10 milliliters per 10 grams of ilmenite and that excellent results are obtained in from 2 to 6 hours of reaction time when employing 20 milliliters of acid to 10 grams of the ore (about 2.4 parts of 12 N acid to 1 of ore by weight).

Reference to the examples of the practice of the invention shows that a low iron, high titanium product can be produced with negligible titanium loss from iron-contaminated source material by utilizing the autogenous pressure of a reaction at an elevated temperature employing at least about 1.2 parts by weight of hydrochloric acid (calculated as the 12 N acid) per part by weight of such titanium source when it contains not over from 12 to 15 percent iron, e.g., as in Sorel slag, or at least about 1.8 parts by weight of the hydrochloric acid (12 N) per part of the ore when such titanium source contains between about 24 and 30 percent iron, e.g., as in ilmenite ore. It is to be noted that the percent of Ti removed during the treatment is usually negligible.

Having described the invention, what is claimed and desired to be protected by Letters Patent is:

1. The method of producing a beneficiated titanium source material low in iron, calcium, and magnesium contaminants from a particulate titanium source selected from the class consisting of ilmenite and by-product slag produced in processing iron contaminated titanium ores for iron which consists essentially of oxidizing said titanium source material by passing an oxygen gas-containing gas through a bed thereof at a temperature of at least 300° C. for at least 1 hour, charging a reaction vessel provided with a heating means with between a 6 to 13 N hydrochloric acid and the thus oxidized titanium source material in an amount by weight of at least 1.8 parts of the acid (calculated at 12 N) when said source is ilmenite and at least 1.2 parts of the acid when said source is by-product slag, per part of said oxidized material, sealing said vessel, heating the vessel so that the charge therein attains a temperature of between 150° and 250° C. for from 0.25 to about 8 hours to effect reaction under the autogenous pressure of the reaction, cooling and opening said vessel, and separating the beneficiated titanium source material from the reaction product thus produced.

2. The method according to claim 1 wherein the oxygen gas-containing gas is passed through said bed at a temperature between 700° and 1000° C. for from 3 to 6 hours.

References Cited in the file of this patent
UNITED STATES PATENTS

| | | |
|---|---|---|
| 1,325,561 | Farup | Dec. 23, 1919 |
| 2,339,808 | Revnestad et al. | Jan. 25, 1944 |
| 2,441,856 | Turner et al. | May 18, 1948 |

OTHER REFERENCES

Barksdale: "Titanium," The Ronald Press Co., 1949, page 310.